United States Patent Office 3,517,053
Patented June 23, 1970

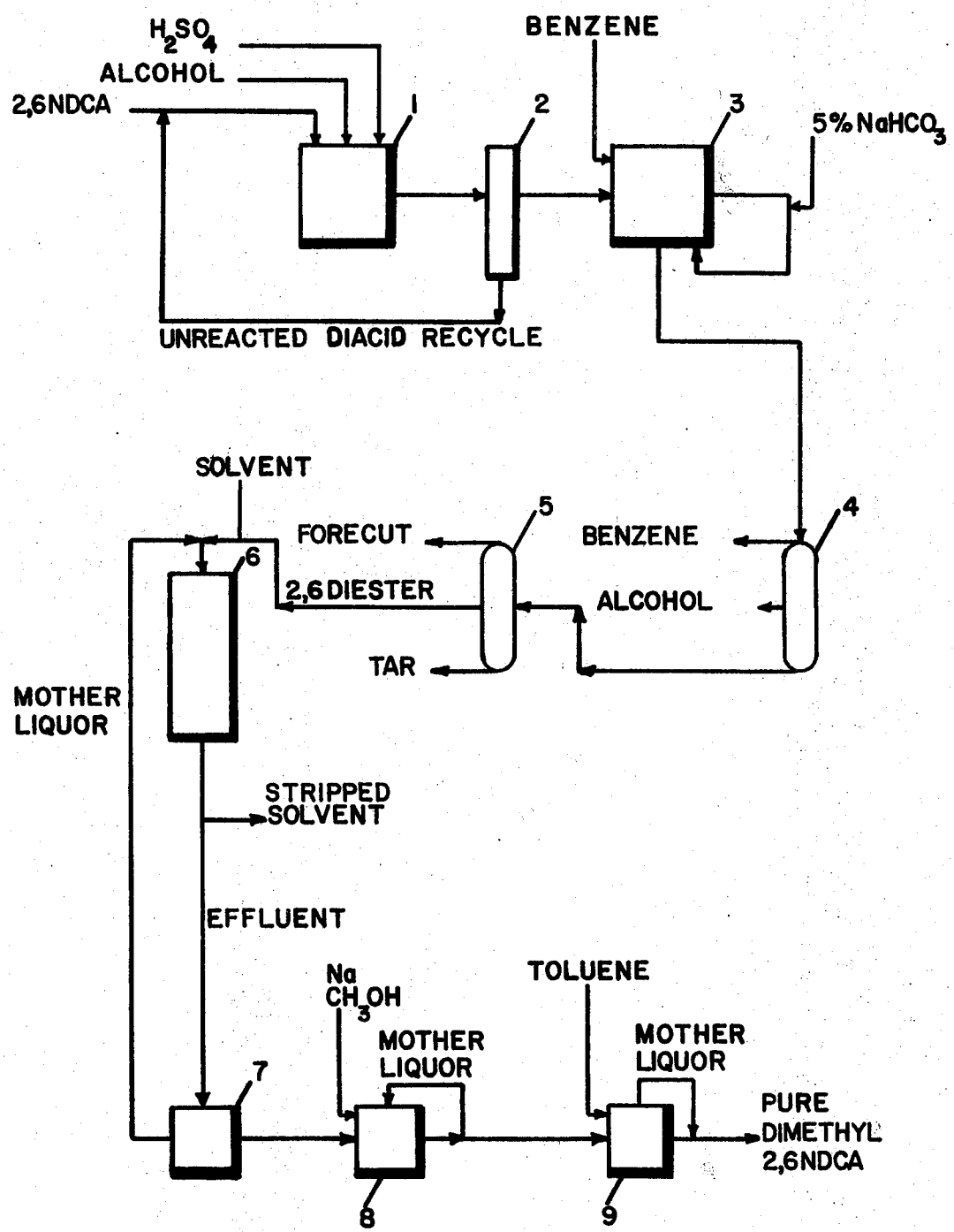

3,517,053
PREPARATION OF COLOR-IMPROVED METHYL ESTERS OF NAPHTHALENEDICARBOXYLIC ACIDS
Donald H. Antonsen, Upper Saddle River, N.J., assignor to Sun Oil Company, Philadelphia, Pa., a corporation of New Jersey
Filed July 17, 1966, Ser. No. 565,859
Int. Cl. C07c 67/06, 69/76
U.S. Cl. 260—475
10 Claims

ABSTRACT OF THE DISCLOSURE

This application discloses a process of preparing high purity, color-improved methyl esters of naphthalenedicarboxylic acids which comprises esterifying a naphthalenedicarboxylic acid with an alcohol containing 2 to 6 carbon atoms to produce a diester, treating a solution of the diester by a chromatographic absorption to remove impurities from the solution and to improve the color of the solution, and transesterifying the diester with methanol to produce the dimethyl ester of the naphthalenedicarboxylic acid. The ester product of this process is characterized by high purity and improved color.

---

This invention relates to a method for the preparation of color-improved methyl esters of naphthalenedicarboxylic acids, particularly of 2,6-naphthalenedicarboxylic acid. Other naphthalenedicarboxylic acids such as the 1,2-; 1,3-; 1,5-; 1,7-; 1,8-; 2,7-; 1,4-; 1,6-; and 2,3-isomers may also be treated by the process of this invention.

Column adsorption chromatography is well known as a tool for the physical separation of mixtures for the purpose of the purification, particularly color improvement, of desired products. The dimethyl ester of 2,6-naphthalenedicarboxylic acid, in pure form, is a white crystalline solid. However, most of the known methods of producing the ester result in a yellow or discolored product indicating the presence of impurities. It would be desirable to subject the disclosed product to an adsorption chromatographic treatment, however the dimethyl ester is either insoluble in most solvents used in the technique or, if soluble, is only so at elevated temperatures at which the efficacy of the treatment is substantially reduced. This invention is directed to a process which overcomes these and other difficulties and which produces a dimethyl ester of naphthalenedicarboxylic acid substantially improved in color.

The process of this invention comprises: esterifying naphthalenedicarboxylic acid with an alcohol containing 2 to 6 carbon atoms; treating a solution of the resulting diester by a chromatographic adsorption; and transesterifying the dibutyl ester to the dimethyl ester of the acid. The resulting color improved dimethyl ester is particularly useful for making polyester fibers.

The naphthalenedicarboxylic acids used as starting materials in this invention may be prepared by any of the methods well known in the art. For example, the acids may be prepared from a dimethylnaphthalene by a process which comprises contacting the dimethylnaphthalene isomer with oxygen and a cobalt salt at oxidation conditions to produce the corresponding naphthalenedicarboxylic acid. The diacid product is contaminated with from about 30 to about 60 weight percent monocarboxylic acid. The crude acid product is treated with benzene to separate a concentrated diacid product the latter being insoluble in benzene. This process is particularly suitable for the production of 2,6-naphthalenedicarboxylic acid.

The acid produced by the above process may then be converted to the pure dimethyl ester by the process of this invention which is most easily described with reference to the figure which schematically represents the process of preparing the dimethyl ester of the 2,6-isomer of naphthalenedicarboxylic acid.

The 2,6-naphthalenedicarboxylic acid (NDCA) is esterified 1 with an alcohol of 2 to 6 carbon atoms in the presence of a mineral acid catalyst. Suitable alcohols include ethyl, propyl, n-butyl, iso-butyl, n-amyl, etc. The reaction mixture from 1 is filtered 2 to remove unreacted acid which is returned to the esterification step 1. Benzene is added to the filtrate from step 2 and the organic solution washed with 5 percent $NaHCO_3$ at 3. Benzene and unreacted alcohol are distilled 4 from the reaction product which is then subjected to a further vacuum distillation in step 5 to remove a forecut and a residue. The 2,6-diester product is purified at step 6 by dissolving the ester in a solvent and passing the solution through a solvent-wet bed of adsorbent. Suitable solvents for this step include benzene, toluene, xylene, cumene, tetralin and esters such as ethyl acetate. This list is not exclusive and would include any solvent for the diester which has little or no tendency to adsorb strongly to the adsorbent. The preferred adsorbent is alumina although charcoal, magnesia and other common adsorbents are also suitable.

The ester is stripped of solvent and recrystallized at step 7. The mother liquor from this recrystallization may be again passed through the adsorbent bed. The recrystallized diester is transesterificated in step 8 with methanol and sodium metal, sodium alcoholate or sodium hydroxide, to precipitate the dimethyl 2,6-ester which is recrystallized from toluene in step 9 to give a dimethyl 2,6-naphthalenedicarboxylate of high purity.

The rate of the esterification, step 1, depends in part upon the ratio of alcohol to diacid, the ratio of esterification catalyst to diacid and the temperature.

The upper limit of the mole ratio of alcohol to diacid is not critical, and the lower limit is that ratio which would be sufficient to form a slurry. A preferred operating range is about 2:1 to 10:1 moles of butanol to moles of acid.

The esterification reaction can be conducted by means of any of the known esterification catalysts. Mineral acids are the usual choice. When sulfuric acid is used as the catalyst, the weight ratio of sulfuric acid to diacid should not be less than 1:10. Below this there is a rapid decline in the amount of diacid converted. When other esterification catalyst such as $H_3PO_4$, $BF_3$, HF and HCl are used, suitable weight ratios can readily be established for effectively promoting the reaction.

The reaction may be conducted at temperatures in the range of from about 80° to 250° C. A range of 100° to 160° C. is preferred.

The process of the present invention is illustrated by the following examples:

EXAMPLE I 100 grams of 2,6-naphthalenedicarboxylic acid, 300 cc. of normal butanol, 7.5 cc. of concentrated sulfuric acid and 50 cc. of xylene were charged into an azeotropic take off system and refluxed for 7 hours at 118° C. The resulting reaction mixture was filtered, removing 42 grams of unreacted acid. 200 cc. of benzene were added to the filtrate and the solution was washed with 100 cc. of 5 percent aqueous $NaHCO_3$. Benzene and butyl alcohol were removed by distillation. A succeeding vacuum distillation step gave the following products:

| | G. |
|---|---|
| Forecut (160° C./0.2 mm.) | 2.0 |
| Product cut (220–230° C./0.2 mm.) | 86.6 |
| Residue (tar) | 4.0 |

5 grams of the dibutyl ester from the product cut, which had an APHA color (American Public Health Association scale) of about 1000, were dissolved in 100 cc. of benzene and the solution passed through a column containing 100 grams of alumina wet with benzene. 300 cc. additional benzene were used to elute the column. The benzene was removed from the product by stripping and a dried weight of 4.8 grams of dibutyl ester which had an APHA color of 500 were recovered. The ester was then recrystallized from benzene. The product from the crystallization had an APHA color of 200. This dibutyl ester (M.P. 80 to 80.5° C.) was dissolved in 50 cc. of methanol. Sodium metal (0.1 grams) was added and the mixture heated for five minutes. The solution was cooled to 25° C. precipitating the dimethyl 2,6-ester. The precipitate was washed with water to give 3.5 grams of a product which melted at 188° C. Upon recrystallization from toluene, a product which melted at 191.5 to 192° C. and which had an APHA color of less than 50 was obtained.

EXAMPLE II

The above process was repeated with ethyl acetate used instead of benzene as the solvent in the alumina purification step.

These examples illustrate that a color-improved dimethyl ester of naphthalenedicarboxylic acid may be prepared by the process of this invention with low product loss.

The process of this invention has several advantages over direct methylation of the acid to form the ester. Firstly, in the initial esterification step higher yields of the $C_2$ to $C_6$ diesters than of the menthyl ester are possible because the $C_2$ to $C_6$ esters may be obtained by azeotropically removing water-alcohol while the methyl ester must be obtained by equilibration reactions in nonazeotropic systems since water and methanol do not form azeotropic mixtures with one another.

With the $C_4$ to $C_6$ alcohols, in the filtering and washing steps, the diester formed is very soluble in the hot alcohol, while the diacid is virtually insoluble thus facilitating the separation of diester from acid. In contrast, both the dimethyl ester and the 2,6-diacid are insoluble in methanol. Furthermore, the diester is very soluble in cold benzene while both the 2,6-diacid and the dimethyl ester thereof are insoluble.

The $C_2$ and $C_3$ alcohols form diesters which are more soluble in the hot alcohol than the $C_4$ to $C_6$ diesters. Although the $C_2$ and $C_3$ alcohols are workable the $C_4$ to $C_6$ alcohols are preferred in this invention with butanol the single preferred embodiment.

In the vacuum distillation step while distillation of the dimethyl ester is very difficult due to a high sublimation rate the $C_2$ to $C_6$ diesters, particularly, the dibutyl ester, distill with ease with no loss due to sublimation.

Finally, in the alumina treatment step many problems would be encountered with the dimethyl ester which are nonexistent with the $C_2$ to $C_6$ diesters. The dimethyl ester is essentially insoluble in benzene, ethyl acetate and in fact, most solvents. Although it is soluble in the higher aromatics, toluene or xylene, elevated temperatures must be maintained to achieve satisfactory solubility. Elevated temperatures reduce the effectiveness of the adsorbent for the chromatographic separation. In contrast, the $C_2$ to $C_6$ diesters are soluble in both benzene and ethyl acetate, and in solvents commonly used in chromatographic separations. Resulting solutions can be treated in high concentrations under ambient temperature conditions.

As may be seen from this discussion, the direct purification of the dimethyl esters by the process of this invention would not be possible. On the other hand, since the $C_2$ to $C_6$ diesters behave well during distillation and exhibit good solubility properties, they may be easily prepared, separated and purified by the process described.

What is claimed is:

1. Process of preparing high purity, color-improved methyl esters of naphthalenedicarboxylic acids which comprises:
   (a) esterifying a naphthalenedicarboxylic acid with a saturated alcohol containing 2 to 6 carbon atoms to produce a diester and separating the diester from the reaction mixture;
   (b) treating a solution of the diester by a chromatographic adsorption to remove impurities from said solution of diester and to improve the color of said solution; and
   (c) transesterifying the diester with methanol to produce the dimethyl ester of said naphthalenedicarboxylic acid, said dimethy ester characterized by high purity and improved color.

2. The process of claim 1 in which said alcohol recited in step (a) is a saturated alcohol containing 4 to 6 carbon atoms.

3. A process according to claim 2 in which alumina is used as the adsorbent in step (b).

4. A process according to claim 2 in which the esterification step (a) is conducted at a temperature in the range of 80° to 250° C.

5. A process according to claim 2 in which the esterification step (a) is conducted at a temperature in the range of 100° to 160° C.

6. A process according to claim 2 in which in the esterification step (a) the mole ratio of alcohol to diacid is in the range of 2:1 to 10:1.

7. The process according to claim 2 in which the alcohol recited in step (a) is normal butyl alcohol.

8. The process according to claim 2 in which the naphthalenedicarboxylic acid is 2,6-naphthalene-dicarboxylic acid.

9. A process according to claim 8 which comprises: distilling unreacted alcohol from the products of step (a); filtering unreacted diacid from the products of step (a); subjecting the resulting filtrate to a vacuum distillation to recover a product comprising the diester of 2,6-naphthalenedicarboxylic acid; treating the diester as recited in step (b); and transesterifying as recited in step (c).

10. The process according to claim 9 in which the alcohol recited in step (a) is normal butyl alcohol.

References Cited

UNITED STATES PATENTS 3,277,154   10/1966   Vanderwerff _____ 260—475

FOREIGN PATENTS 9,922,296   5/1965   Great Britain.

OTHER REFERENCES

Elsevier's Encyc. of Org. Chem., vol. 12B, p. 4684.

LORRAINE A. WEINBERGER, Primary Examiner

E. J. SKELLY, Assistant Examiner